July 19, 1966 B. G. COETSEE 3,262,103

TIME OF EVENT RECORDER

Filed Sept. 6, 1962

INVENTOR.
B. G. COETSEE

BY [signature]

ATTORNEY 3,262,103
Patented July 19, 1966

3,262,103

TIME OF EVENT RECORDER

Barry G. Coetsee, Palo Alto, Calif., assignor to International Telephone and Telegraph Corporation, New York, N.Y., a corporation of Maryland Filed Sept. 6, 1962, Ser. No. 221,752
9 Claims. (Cl. 340—174)

Figure 1A:
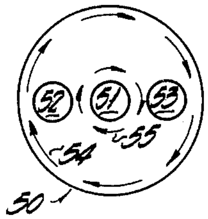

This invention relates to data storage devices and more particularly to devices for storing a record of the time when an event occurs.

Time of event recorders are devices which (a) relate the occurrence of an event or events to a time base, (b) store information data as a memory of the time when an event occurs, and (c) provide read out of such data in response to a command signal. While these recorders find many uses, it may be helpful here to describe a specific use by way of example. According to this example, a computer monitors a machine designed to run through a pre-determined work cycle. If the machine fails satisfactorily to perform every step in its entire cycle, the computer prints a record so that maintenance may be performed or the machine may be redesigned. Thus, for example, the machine may be designed to cut-off its motors, move, retract, or eject a part, assume a physical attitude, etc. If a part fails to move, retract, etc. when required to do so the machine might break if it attempts the next step in its work cycle. If the machine is very complicated, a discovery of the failure to move, retract, etc. might be possible only after a long and costly research program. However, with the time of event recorder, it is only necessary to study a record of machine operations to learn where the failure occurred. Then, a redesign or improvement becomes relatively simple.

To be especially useful, the time of event recorder should be able to control telemetering equipment. Thus, if the machine is moving in an inaccessible place or an environment which is hostile to men for example, telemetered signals to a stationary computer make a record of any abnormal events that occur. To do this, the recorder should provide non-destructive read out. This way, the computer can interrogate the recorder and verify the telemetered signals that are received. Finally, the computer should be able to command an erase of all stored data. Thus, the vehicle may be thoroughly tested and retested without risk of human life.

These are only a few examples of when and how a time of event recorder may be used. Those skilled in the art will readily perceive many other uses of these devices.

An object of this invention, is to provide new and improved data storage devices. A more specific object is to provide storage devices for recording the time or times when a specified event or events occur. In this connection, an object is to provide a source of telemeter signals representing an event and time of its occurrence. In particular, an object is to store information, to provide non-destructive read-out, and to erase all stored information upon command.

Another object is to provide a circuit of general utility which release electrical command signals to a time base. Here an object is to mark the output of a clock source responsive to either randomly or cyclically occurring signals.

Yet another object is to provide an electronic data recorder which is particularly well suited for mobile installation. In this connection, an object is to provide a light weight recorder unit capable of withstanding severe mechanical shock. A further object is to provide an electronic data recorder unit which requires a minimum power source.

In accordance with one aspect of this invention, a time of event recorder includes a number of magnetic core devices arranged in a rectilinear coordinate array. Each core includes a number of windows or apertures. The cores are arranged in a plurality of vertical groups or columns by a series of windings (a series per column) wound through a first window or aperture in each core. The cores are also arranged in a plurality of horizontal groups or rows by a series of windings (a series per row) threaded through a second window or aperture on each core. This completes the rectilinear array.

A clock pulse source drives a binary counter to energize in binary code the series of windings threaded through the first windows or apertures. The horizontal windings are energized upon the occurrence of an event assigned to be recorded on a horizontal row basis (i.e. event "1" is recorded in row "1," event "2" in row "2," etc.). When this happens, a core switches or changes its magnetic state at the intersection of any energized vertical and horizontal windings. Since the vertical windings are selectively energized (or de-energized) in a binary code which changes as a function of time, the time of event is indicated by the horizontal positions of switched cores. Since the horizontal windings are selectively energized as a function of the events to be recorded, the identity of such events are indicated by the vertical locations of the switched cores.

Figure 1B:
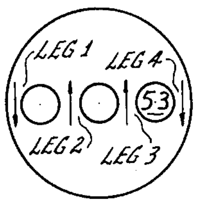
Figure 1C:
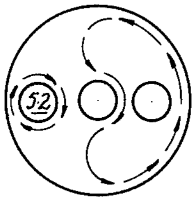
Figure 1D:
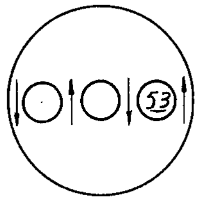
Figure 2:
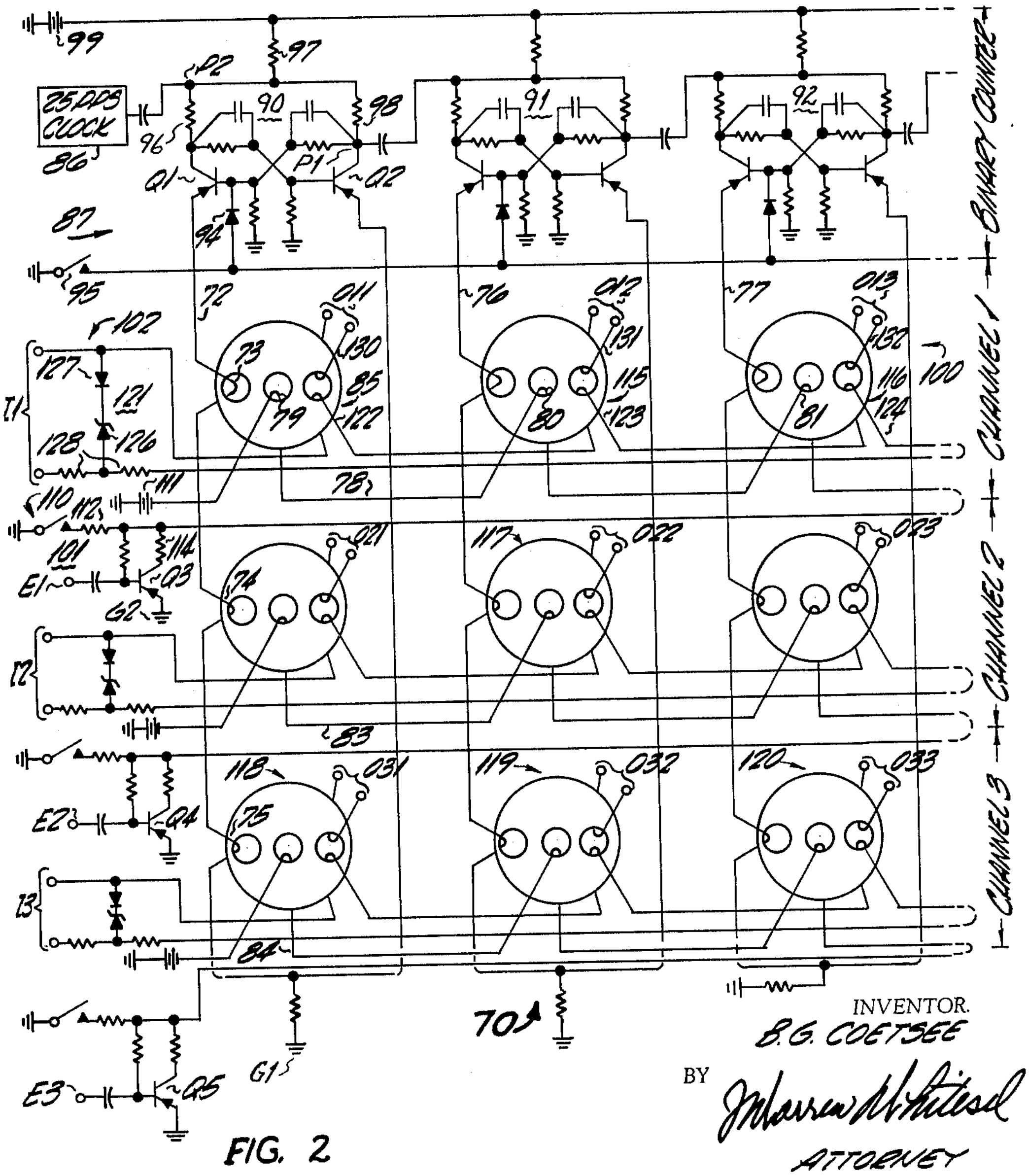

The above mentioned and other features of this invention and the manner of obtaining them will become more apparent, and the invention itself will be best understood by reference to the following description of the embodiment of the invention taken in conjunction with the accompanying drawings, in which:

FIGS. 1*a–d* are schematic diagrams showing of how core flux changes in response to input signals; and FIG. 2 is a schematic circuit diagram showing an exemplary time of event recorder embodying the principles of the invention.

While those familiar with magnetic core devices will understand the nature of multi-apertured or multi-windowed magnetic core devices, it may be helpful to review such devices briefly, so that the invention will be better understood. For this, reference is made to FIG. 1. There, a three windowed or apertured core device 50, preferably made of substantially square hysteresis loop magnetic material, is shown to illustrate its stable states of magnetization. Since these devices are well known, no attempt is here made to show the relative sizes of the windows.

A number of windings, not shown in FIG. 1, are wound through the apertures of the cores. On each core, a first of the apertures, 51, contains a "blocking" or "zeroing" winding having a number of ampere-turns adequate to put the core flux into a condition described as "blocked" or "zero." The blocking windings of all cores in the recorder may be energized simultaneously to provide a complete recorder zero set. Or, the blocking windings may be energized selective to provide an event zero set in selected cores. The left-hand aperture 52 of each core contains a "set" winding having a number of ampere-turns adequate to saturate a portion of the core material adjacent the aperture. The right-hand aperture 53 of each core contains two windings: one called a "read-out drive" or "interrogation" winding, and the other called a "read-out" winding. The effects produced by the flux generated by or the voltage induced in these windings will be apparent from the following study of FIGS. 1*a*–1*d*.

FIG. 1*a* shows the core flux resulting from an energization of the blocking winding in aperture 51. That is, the core is effectively divided into a four legged magnetic structure by the apertures 51, 52, 53, the legs being labeled in FIG. 1*b*. When the blocking winding in aperture 51 is energized, all core flux is oriented in a clockwise direction, for example, relative to the aperture 51 (as shown by the arrows 54, 55), and all four core legs are saturated.

When energized, the set winding in aperture 52 reorients the flux in the core as shown in FIG. 1*b*. That is, the flux in legs 1 and 3 reverses direction; the flux in legs 2 and 4 retains its original "blocked" direction. The important thing to note is that the flux in legs 3 and 4 is oriented in the same direction in a "blocked" core and opposite directions in a "set" core.

If the read-out drive or interrogation winding in aperture 53 is pulsed while the core is blocked (as shown in FIG. 1*a*), there is no flux change around the magnetic loop including legs 3 and 4. For example, if this interrogation or drive winding is pulsed by current in a direction to produce a clockwise M.M.F. around aperture 53, flux can not increase in the already saturated leg 4. If the direction of current in this winding is reversed to produce a counter-clockwise M.M.F. around aperture 53, flux can not increase in the already saturated leg 3. Since Kirchoff's laws apply, a flux change could occur when the interrogation or drive winding is pulsed if the M.M.F. appears in the magnetic loop including legs 2 and 4. The result would be a false "set" condition with flux changed as shown in FIG. 1*c*. Such a flux change would cause a faulty reading in the time of event recorder; therefore, current in the interrogation or drive winding must be limited to the level below that required to influence the flux in leg 2.

If the read-out drive or interrogation winding of a "set" core is pulsed, a flux change occurs to induce a voltage in the read-out winding. Recall that the flux in a normal "set" saturates the core legs in the magnetic directions indicated by the arrows of FIG. 1*b*. If the read-out drive or interrogation winding in aperture 53 is pulsed by a current which produces a counter-clockwise M.M.F., the flux of legs 3 and 4 reverses direction to induce an output signal voltage in the read-out winding in aperture 53. The core flux is now oriented as shown in FIG. 1*d*. If the interrogation winding is now pulsed by current in an opposite direction, core flux returns to the condition of FIG. 1*b* and a second output voltage pulse is induced in the read-out winding. Hence, it is apparent that the read-out drive pulse may produce any number of read-out signals.

All interdependent core legs have equal cross sectional area. Thus, when the flux in leg 1 reverses direction as the core is switched from the "blocked" stages (FIG. 1*a*) to the "set" state (FIG. 1*b*) all resulting flux change occurs in leg 3, and no flux change occurs in leg 4. If, for example, the effective cross-sectional area of leg 1 were greater than the effective area of leg 3, an excessive flux potential would result from the change in leg 1 to produce an unwanted flux reduction in leg 4.

With the foregoing description of a multi-aperture core device in mind, the principles of the invention will become apparent from a study of FIG. 2. In general, this figure shows a rectilinear, coordinate array 70 of multi-aperture magnetic core devices. The cores are arranged into a plurality of vertical groups or columns by a number of series circuits formed by set windings. For example, the first column is identified by the series circuit 72 including the set windings 73, 74, 75 and perhaps others not shown. The second and third columns are identified by similar series circuits 76, 77. Other columns may be provided also.

The cores are arranged into a plurality of horizontal rows by a number of series circuits formed by blocking windings. For example, the first row is identified by a series circuit 78 including the blocking windings 79, 80, 81, and perhaps others. In like manner the second and third rows are identified by similar series circuits 83, 84. Other rows may also be added.

Thus, the rectilinear array 70 includes vertical columns and horizontal rows with a core device at each intersection. For example, the core device 85 is located at the intersection of column 72 and row 78. Since there are three vertical columns and three horizontal rows, there are nine core devices (3×3=9). If there were ten vertical columns and fifteen horizontal rows, for example, there would be a hundred-fifty core devices. In a similar manner, any other convenient number of core devices may be provided. The terms "vertical column" and "horizontal row" are adopted for convenience of expression because they describe the layout of the FIG. 2 drawing. No further significance should be attached to those terms.

In keeping with the invention, each vertical column is individually prepared to store data as a function of the output of a time base generator. The time base generator includes a clock pulse source 86 which drives a binary counter 87 at any desired rate (25 pulses per second in this example). The source 86 may be a free running multivibrator, for example. The binary counter may be a cascaded series of flip-flop circuits. The output of each flip-flop circuit is connected to prime a corresponding vertical column during an individual time frame. Thus, the first column 72 is energized when the left-hand side of the first flip-flop circuit 90 is conductive. The second column 76 and third column 77 are energized when the left-hand sides of the second and third flip-flop circuits 91, 92 are conductive. After the counter 87 completes its binary count, the cycle repeats and flip-flop circuit 90 again energizes the column 72. Thus, it should be apparent that each column is energized during a time frame defined by a binary code of output pulses.

All of the flip-flop circuits utilized in the ring counter are well known; therefore, it is thought that a brief description of how the one stage 90 operates will teach those skilled in the art. That one stage includes two transistors Q1, Q2, a reset circuit including the diode 94, and a number of biasing resistors. To start a time base count from a zero position, a start switch 95 is closed and a ground pulse is transmitted through the diode 94 to the base of the transistor Q1. If it was "on," the transistor Q1 turns "off" because its base goes positive relative to its emitter. When the transistor Q1 turns "off," the current flowing through the resistors 96, 97 ends. There is no further IR drop across these resistors and the base of transistor Q2 goes negative from the potential of battery 99. The transistor Q2 turns "on" and draws current to cause an IR drop across the resistors 97, 98 and also to apply the ground G1 potential to point P1. This holds transistor Q1 "off" because it keeps the base of transistor Q1 positive with respect to its emitter. At this time, all left-hand transistors in the ring counter 87 (similar to transistors Q1) are "off" and all corresponding to transistor Q2 are "on." None of the vertical column series circuits 72, 76, 77 are energized.

The clock pulse source 86 makes the point P2 go positive (then negative) at a rate of twenty-five pulses per second. When point P2 goes positive, the transistor Q2 cuts-off because its base goes positive relative to its emitter. As the current through the resistors 97, 98 drops and the ground G1 potential disappears, the base of transistor Q1 goes negative relative to its emitter. The transistor Q1 turns "on" and current flows over the circuit from battery 99 through resistors 97, 96, transistor Q1, windings 73, 74 and 75 to ground G1. This holds the transistor Q2 "off."

The flip-flop cycle repeats as long as source 86 runs. Each time transistor Q2 turns "on," a pulse is sent to stage 91.

Those familiar with binary counting will recognize the above described flip-flop operation. Moreover, it will be apparent that the circuits 72, 76, 77 are energized in coded combination to provide a great number of time frames. Conventionally these coded combinations are described by the symbology of a truth table, as follows:

*Truth table*

| Time Frame | Conductors | | | |
|---|---|---|---|---|
| | 72 | 76 | 77 | Etc. |
| 0 | 0 | 0 | 0 | ------ |
| 1 | 1 | 0 | 0 | ------ |
| 2 | 0 | 1 | 0 | ------ |
| 3 | 1 | 1 | 0 | ------ |
| 4 | 0 | 0 | 1 | ------ |
| 5 | 1 | 0 | 1 | ------ |
| 6 | 0 | 1 | 1 | ------ |
| 7 | 1 | 1 | 1 | ------ |
| 8 | 0 | 0 | 0 | ------ |

Thus, if conductors 72, 76 are energized simultaneously, for example, it is the third time frame.

Means are provided for recording the time when specified events occur. As here shown, three events can be recorded; although, more events can be recorded in larger arrays. More particularly, each event is recorded in a separate row of core devices which, in turn, are combined with other devices to form recording channels. That is, each channel includes a horizontal row of core devices, such as 100, an event record circuit 101, an interrogation circuit 102, and a plurality of output circuits O11, O12, O13. As will become more apparent, the time when an event occurs is identified by the horizontal location of blocked and set cores in the channel assigned to record as a function of that event.

To erase stored information, all cores in a channel are blocked. To understand this erase, consider channel 1 by way of example. It includes a "0" set circuit 110, an event record input terminal E1, an interrogation input terminal I1, and three read-out terminals O11, O12, O13. The "0" set circuit is traced from a battery 111, over a series circuit 78, which includes windings 79, 80, 81, a current limiting resistor 112, and a switch 110 to ground. The "0" set current is relatively heavy and all associated cores are "blocked" with the flux pattern shown in FIG. 1*a*. Then, contacts 110 are opened. All cores are now blocked, and any previously recorded information is erased.

The event record circuit includes an electronic switch Q3 connected in parallel with the "0" set switch. The electronic switch is here shown as a PNP transistor arranged in common emitter configuration. The bias potentials are such that the transistor Q3 is normally "on." Thus, the emitter ground G2 is applied through the transistor Q3 and resistor 114 to circuit 78. The resistor 114 limits current so that a set core (the pattern of FIG. 1*c*) will not be blocked, but as long as current flows through transistor Q3, a blocked core cannot be set.

To record an event in channel 1, a pulse caused by an occurrence of the event appears at terminal E1 and makes the base of transistor Q3 positive relative to its emitter. The transistor Q3 switches "off" for the pulse period while its base is positive. For convenience of description, assume that the event occurs during the third time frame period following the "zero" time (i.e. it is zero time when the switches 95, 110 were closed then opened). From the above truth table, we learn that conductors 72, 76 are energized during the third time frame. Before the event, while the transistor Q3 is "on," the current in windings 79–81 prevents the cores 85, 115, 116 from setting. During the event, while transistor Q3 is "off," the current in series circuits 72, 76 set the cores 85, 115. There is no current in the series circuit 77 and the core 116 is not set. Thereafter, transistor Q3 again switches "on," but the limited current in windings 79, 80 is not sufficient to switch the cores 85, 115 back to a blocked state. However, the current in winding 81 is adequate to hold the core 116 in a blocked condition when the series circuit 77 is energized during the fourth time frame.

If and when events $E_2$, $E_3$ occur, the transistors Q4, Q5 switch "off," then "on." While these transistors are "off," the cores in channels 2 and 3 are "set" in accordance with the binary coded output of the counter 87. For example, if event $E_2$ should occur during time frame "2," we learn from the truth table that the core 117 is "set." If the event $E_3$ should occur during time frame "7," the cores 118–120 are "set." If, by chance, two or more events occur simultaneously, corresponding cores are set in corresponding channels. Thus, if all events $E_1$, $E_2$, $E_3$ occur during the time frame "2," only the cores 115, 117, 119 are set.

Means are provided for interrogating the time of event recorder on a "per channel" basis to provide output pulses which indicate the time when each event occurs. Since all interrogation circuits are the same, only the interrogation circuit 102 of channel 1 is described in detail. It includes a pair of input terminals I1, a current limiting circuit 121, and a series of interrogation windings 122, 123, 124.

One characteristic of the core device is that, with the number of turns provided in the interrogation windings, an unlimited current flow in one direction will not produce any adverse magnetic effects in a blocked core. But, an unlimited current flow in a reverse direction may reversely set the core and, perhaps, cause a false reading. Therefore, when the upper one of the input terminals I1 is positive and when the voltage across terminals I1 exceeds a certain potential, a zener diode 126 breaks down. The diode 127 is back biased and prevents the zener breakdown when the upper I1 terminal is negative. The resistors 128 limit current flow.

Since it is assumed that the cores 85, 115 are set when the event $E_1$ occurs, current flow in windings 122, 123 produces the change in flux pattern exemplified by FIGURE 1*b*. Since core 116 remained blocked because circuit 77 is not energized during the third time frame, the current in winding 124 produces no change in flux pattern. These flux change conditions induce an output voltage pulse in read-out windings 130, 131, but not in read-out winding 132.

Any suitable equipment may be connected to the output terminals O11, O12, etc. For example, telemetering equipment may be adapted to send suitable signals to a remote location responsive to induced voltage pulses appearing at out terminals O11 and O12. When interrogation input terminals I2 are pulsed, this same telemetering equipment may send a signal in response to a voltage pulse induced at output terminal O22—assuming that core 117 is set in channel 2. In like manner, each channel is interrogated separately and individually.

In the above description, the "set" core flux write-in change was described as occurring when winding 73 was energized and the winding 79 was de-energized. The reverse condition could also be used. If so, the vertical windings of circuits 72, 76, 77 are energized by the currents in the collector circuits of the "on" binary transistors of the counter. When a "zero" condition occurs in a binary stage, a current flows in the vertical windings of a column of cores associated with this "zero" condition binary stage. In this condition, an event pulse at a terminal E will not affect the flux of the cores. When a "one" condition occurs in a binary stage, no current flows in the vertical windings of the associated column of cores because these windings are in the collector circuits of the binary transistor that is then "off." Thus, when a column of cores is in a "one" condition (i.e. no current in the vertical windings), the cores can be affected by the appearance of an event pulse at a terminal E.

Stated another way, in this embodiment of the invention, the event pulse writes a "one" into any core that is not then blocked by current in a vertical winding. These event pulse controlled windings are horizontally arranged in the array 70. Thus, when an event pulse occurs in any channel, the condition of the binary counter is written into the horizontal row of cores associated with that channel. Since the condition of the binary counter at any moment represents the elapsed time (measured in 40 ms. intervals in one recorder) the time of the event is recorded with a 40 ms. resolution.

The time of event recorder explained in the foregoing description may be further modified without departing from the scope of the invention. For example, it is not essential that the binary counter 87 start at a "zero" position. In some embodiments, certain binary count signals may cause sequential interrogations and then a "particular" binary count signal may block all cores, thereby causing a reset. Thus, the output signals indicate the time of event relative to the time of the preceding "particular" count signal. In other embodiments, the "zero" set could occur in response to a "zero" event pulse. The point is that one command signal may cause one or more non-destructive read-outs and another command signal may cause an erase of stored information. In still other embodiments, the recorder could be changed into a sequence of events recorder by substituting a sequencing switch for the clock pulse source 86 and binary counter 87. Moreover, since read out is non-destructive, the recorder may be interrogated repeatedly. It is only necessary to reverse the polarity of interrogation pulses. This way telemeter equipment may repeatedly interrogate and verify any stored information.

While the invention has many advantages which will occur to those skilled in the art, it may be helpful to note a few. First, read-out is non-destructive. Second, by adding any number of binary counter stages the resolution may be increased. For example, a ten core channel provides $2^{10}$ or 1024 recording intervals. If the binary counter is driven through its cycle in forty seconds, the resolution is a series of pulse periods having less than 40 milliseconds. In this case, the event pulse should be in the order of 10 milliseconds or less. Third, all components have been selected to withstand severe mechanical shock. In addition, the entire assembly may be potted in semi-rigid epoxy resin to withstand many "G's." Also, the power requirements are small. Thus, the recorder is especially well adapted for mobile use, and especially for mobile use aboard modern highly maneuverable, fast accelerating aircrafts and rockets. Those skilled in the art will readily perceive other advantages also.

While the principles of the invention have been described above in connection with specific apparatus and applications, it is to be understood that this description is made only by way of example and not as a limitation on the scope of the invention.

I claim:

1. A time of event recorder comprising a source of clock pulses, a binary counter having a predetermined number of stages and driven by the output from said clock pulse source, a plurality of event recorder channels, each of said channels having said predetermined number of stages and having an event controlled input terminal per channel, means responsive to the output of each counter stage for preparing a corresponding stage in each recorder channel, means responsive to the occurrence of an event to be recorded for pulsing the input terminal of a channel assigned to record that event, means responsive to said event caused pulsing of an input terminal for storing data information in any stage of that particular channel which is then prepared by said counter, means responsive to a first command signal for non-destructively reading out said stored information, and means responsive to another command signal for erasing all of said stored information.

2. A time of event recorder comprising a source of clock pulses, a counter having a predetermined number of stages and driven by the pulses from said source to provide a plurality of time frames, a plurality of recorder channels, each of said channels having said predetermined number of multi-apertured magnetic devices, means associated with one of said apertures and responsive to the output of said counter for causing a change of flux in certain of the channel devices associated therewith, said response to said output changing with each successive time frame, an event record circuit associated with another of said apertures and common to all said devices in a corresponding channel, means responsive to energization of said record circuit for normally blocking any of said change of flux in said device, and means responsive to the occurrence of an event to be recorded for disabling said blocking means in a channel assigned to record that event, whereby the flux of the devices energized by the output of said counter changes for storing data information.

3. The recorder of claim 2 and means associated with a third of said apertures and responsive to a first command signal for non-destructively reading out said stored information, and means associated with said other aperture and responsive to another command signal for erasing all of said stored information.

4. A time of vent recorder comprising means for providing binary coded output signals, said coded signals occurring as a function of time, a plurality of recorder channels, each of said channels having a row of multi-apertured magnetic devices, one aperture in each of said devices in a multi-channel column of said devices being energized in said binary code responsive said output signals, an event responsive recording means for normally energizing another aperture in each of said devices in a channel row of said devices to produce magnetic effects in said devices which effectively prevent any response in said devices to said output signals, and means responsive to the occurrence of an event to be recorded for blocking the effect of said recording means in a channel assigned to record that event whereby said event causes a flux change in any of said devices then energized in binary code by said output signals for storing data information.

5. A time of event recorder comprising means for giving a zero set, a source of sequential output signals that change as a function of time relative to said zero set, a plurality of magnetic data storage devices for recording an occurrence of an event also relative to said zero set, means responsive to the output signals for sequentially preparing certain ones of said devices for flux change, and means responsive to the occurrence of said event for causing said flux change in the prepared devices to record the time when the event occurred relative to the time of said zero set.

6. The recorder of claim 5 wherein each of said devices comprise a square hysteresis loop core having a plurality of apertures, said signal responsive means being associated with a first of said apertures, said event responsive means being associated with a second of said apertures, and means associated with a third of said apertures and responsive to a first command signal for non-destructively reading out said stored information, and means also associated with said second aperture and responsive to another command signal for erasing said flux change.

7. A time of event recorder comprising a source of drive pulses, a plurality of data storage devices for recording an occurrence of an event, each of said storage devices comprises a three apertured magnetic core device having a substantially square hysteresis loop, means including a first winding associated with a first aperture on each of said cores devices for blocking said core to provide a "0" set, means including a second winding associated with a second aperture on each core device for setting the associated core to provide a "1" set, means responsive to said drive pulses for sequentially energizing said second windings of selected ones of said devices, the selection being made as a function of time, means for normally energizing said first windings at a level which exactly cancels the magnetic effects produced on said devices by the energization of said second windings, and means responsive to the occurrence of said event for removing said normal energization of said first windings to store data information in the one of said devices which then have an energized second winding.

8. The recorder of claim 7 and means including a third winding associated with a third aperture on each core device for interrogating the device, means including a fourth winding on each core also associated with said third aperture for giving either a "0" or a "1" output signal when said third winding is energized, said "0" or "1" output signal depending on whether the core is set or blocked, and means for pulsing said third winding on all core devices assigned to record a particular event.

9. A time of event recording circuit comprising a rectilinear coordinate array of magnetic core devices, means comprising a pulse driven circuit for individually pulsing a selected row of said cores when an event corresponding to said row occurs, means for changing the magnetic state of a core device at the intersection of any of said columns and rows that are pulsed, means for providing a readout signal responsive to the magnetic states of said devices thereby indicating the time when an event occurred, each of said core devices having a plurality of apertures, means including a first winding associated with a first aperture on each of said core devices for blocking said core, means including a second winding associated with a second aperture on each of said cores for setting the associated core, means including a third winding associated with a third aperture on each of said core devices for interrogating the core, means including a fourth winding also associated with said third aperture for giving either of two output signals depending on whether the core is set or blocked, each of said columns being formed by a series of said second windings, each of said rows being formed by a series of said first windings, means for pulsing a series of said third windings on a per row basis for non-destructively reading out information stored in the pulsed row, and means responsive to another command signal for pulsing said first windings on a per row basis to erase all said stored information.

References Cited by the Examiner

UNITED STATES PATENTS 3,075,183 1/1963 Warman et al. -------- 340—174

BERNARD KONICK, *Primary Examiner.*

IRVING L. SRAGOW, *Examiner.*

M. K. KIRK, J. W. MOFFITT, *Assistant Examiners.*